Feb. 2, 1965 G. W. JACKSON 3,168,091
CONTROLLED DRAFT DEVICE FOR COMBUSTION HEATERS
FOR ENCLOSED VEHICULAR STRUCTURES
Filed April 24, 1962 2 Sheets-Sheet 1
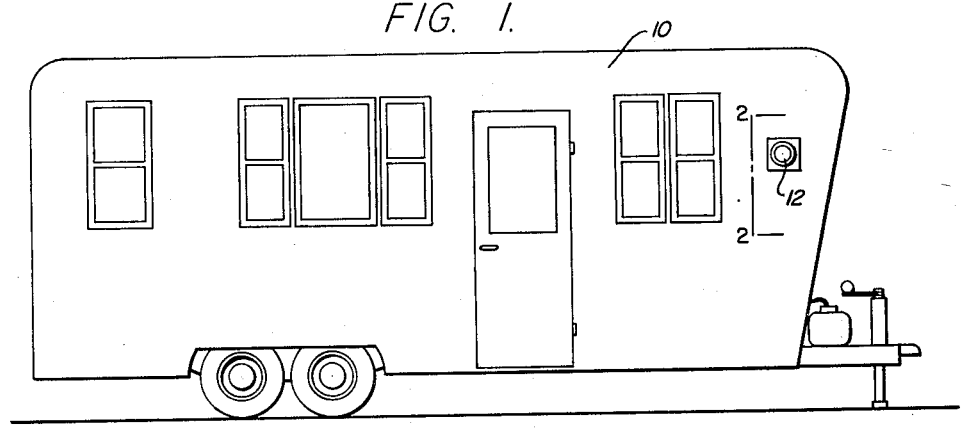
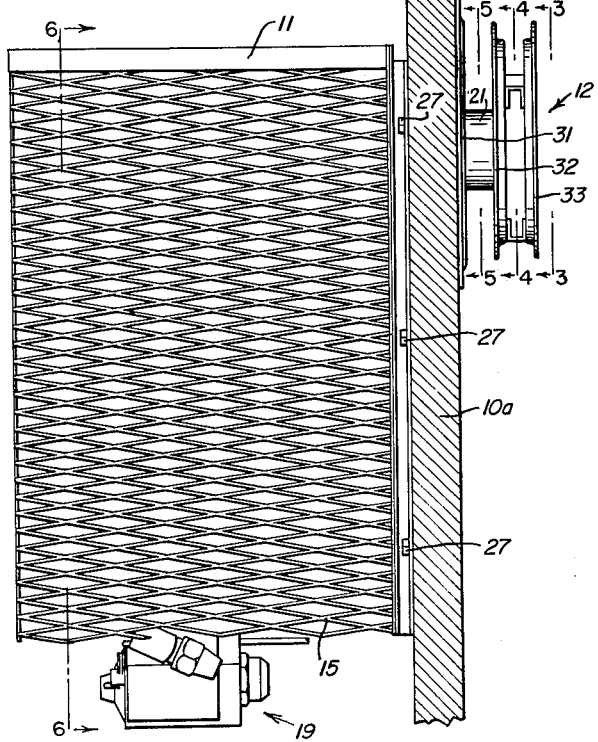
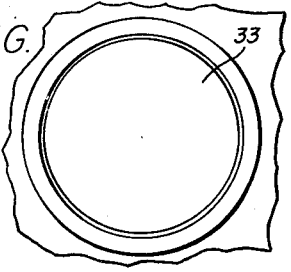
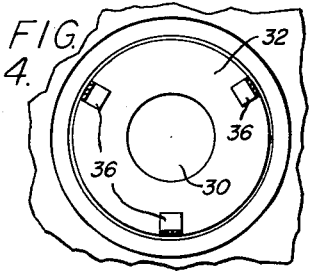
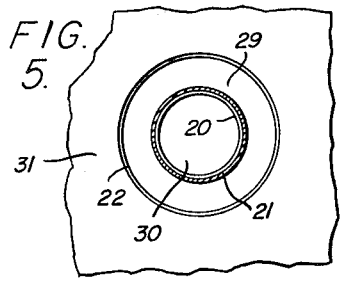
INVENTOR.
GEORGE W. JACKSON
BY
ATTORNEYS

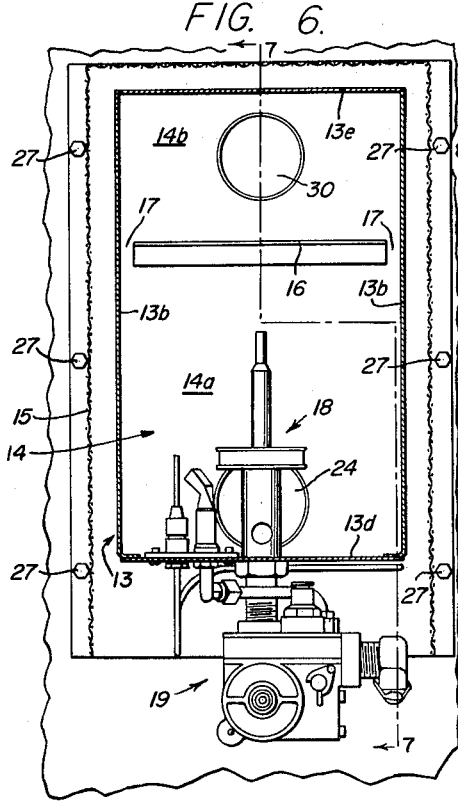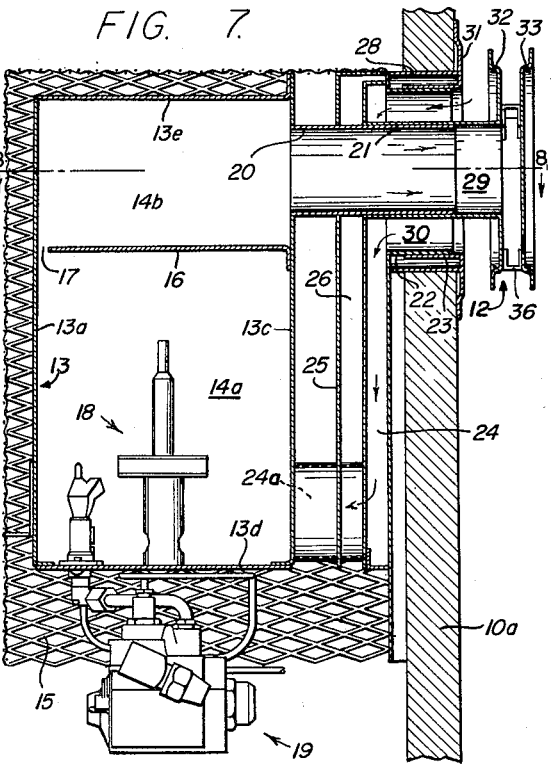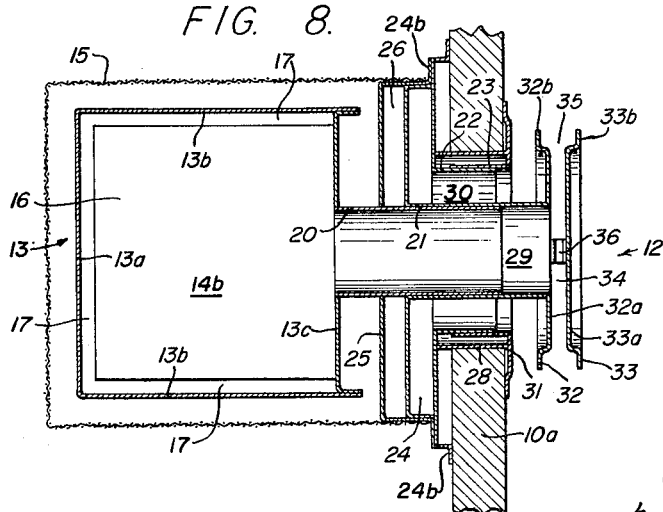

United States Patent Office 3,168,091
Patented Feb. 2, 1965

3,168,091
CONTROLLED DRAFT DEVICE FOR COMBUSTION HEATERS FOR ENCLOSED VEHICULAR STRUCTURES
George W. Jackson, Salt Lake City, Utah, assignor to Utah Hydro Corporation, Salt Lake City, Utah, a corporation of Utah
Filed Apr. 24, 1962, Ser. No. 189,736
1 Claim. (Cl. 126—307)

This invention relates to combustion heaters requiring atmospheric draft for fuel consumption and particularly to such heaters designed for use in enclosed vehicular structures, such as house trailers, during highway travel.

Combustion heaters or furnaces utilizing liquefied petroleum gas as fuel and provided with draft control devices for exterior installation, to provide an effective draft but for preventing undesirable draft conditions during travel of house trailers, are well known. Great difficulty has been experienced with these, however. While it is intended that proper draft conditions be insured at all times, experience has proven that heretofore known apparatus is unreliable. Normal traveling speeds cannot be maintained without danger of extinguishing the gas burner, and gusts of wind often lead to the same result.

A principal object in the making of the present invention was to provide an improved construction eliminating past difficulties and truly insuring proper draft conditions at all times, even while traveling along a highway at unusually high speeds for such vehicles, e.g. at ninety miles an hour.

Other objects were to provide for safe installation and operation, maximum compactness with effective heat transfer, and economical construction.

An outstanding feature in the accomplishment of the principal object is a dual type of draft diverter having a special configuration that assures at all times lower pressure at the exhaust port for combustion gases than at the air-intake port, regardless of travel or wind conditions.

A specific embodiment representing what is presently regarded as the best mode of carrying out the invention is illustrated in the accompanying drawings. From the detailed description which follows, other more specific features and objects of the invention will become apparent.

In the drawings:

FIG. 1 is a view in side elevation showing a vehicular dwelling in the nature of a house trailer equipped with a heater conforming to the invention;

FIG. 2, a fragmentary vertical section taken on the line 2—2 of FIG. 1 and drawn to a much larger scale, the heater being shown in side elevation;

FIG. 3, a fragmentary elevation taken on the line 3—3 of FIG. 2 to show the draft control portion of the heater;

FIGS. 4, 5, and 6, vertical sections taken on the lines 4—4, 5—5, and 6—6, respectively, of FIG. 2;

FIG. 7, a vertical section taken on the line 7—7 of FIG. 6; and

FIG. 8, a horizontal section taken on the line 8—8 of FIG. 7.

Referring to the drawings:

In the house trailer 10 of FIG. 1, the internal combustion heater 11 of FIG. 2 is mounted against a side wall 10a, with its air-intake and exhaust pipe structures extending through such wall and communicating with a special type of dual-draft diverter 12 positioned exteriorly of the trailer 10 in communication with the atmosphere.

The heater 11 includes a box-like heat exchanger 13, FIGS. 6–8, having front wall 13a, side walls 13b, rear wall 13c, bottom wall 13d, and top wall 13e of steel or other suitable material having good heat transfer properties defining a combustion chamber 14. A grillwork 15 encloses such heat exchange in spaced relationship as a protection to occupants of the trailer.

A horizontal partition 16, spaced from front and side walls of the heat exchanger to provide peripheral air flow passages 17 contiguous with such walls, divides the combustion chamber into a lower part 14a and an upper part 14b. A gas burner assembly 18 is positioned in the lower portion of the combustion chamber's lower part 14a and is supplied with gas through conventional supply mechanism 19 from a source of liquified petroleum gas (not shown).

The exhaust pipe structure comprises telescoped exhaust pipes 20 and 21 extending from upper part 14b of the combustion chamber, through rear wall 13c of the heat exchanger, and rearwardly a distance sufficient to pass through trailer wall 10a and to project into the atmosphere exteriorly of the trailer. It is convenient to fabricate pipe 20 as part of heat exchanger 13 and pipe 21 as part of dual-draft diverter 12.

The air-intake pipe structure comprises telescoped pipes 22 and 23, which surround the exhaust pipe structure in spaced sleeve relationship therewith, a broad and flat compartment 24, which extends downwardly from communication with the pipes 22 and 23 rearwardly and exteriorly of heat exchanger 13, and, finally, a pipe 24a, which extends horizontally from communication with the lower end of compartment 24 to communication with the lower portion of the combustion chamber's lower part 14a.

Between compartment 24 and heat exchanger 13 is a wall 25 for defining a restricted heat channel 26 rearwardly of such heat exchanger. Mounting bracket portions 24b, FIG. 8, of the walls of compartment 24 are conveniently employed for spacing the heat exchanger outwardly from wall 10a and for securing the heater to such wall, as by means of bolts 27, FIG. 6.

Outer sleeve structure 28 preferably surrounds telescoped exhaust pipes 20 and 21 to define dead air space between them and wall 10a.

The dual-draft diverter or control means 12 is of special formation to assure at all times lower pressure at exhaust port 29, FIG. 8, for combustion gases than at air-intake port 30. As is customary, such diverter or draft control means advantageously comprises circular air-intake structure and circular gas-exhaust structure open about their peripheries and located side-by-side on a common axis which is the axial center of the air-intake and exhaust ports. Unusual is the Venturi nature of the exhaust diverter passage, with the exhaust port intersecting the circular Venturi throat along and intermediate the constant diametric length of such throat.

In the specific form illustrated, such air-intake and gas-exhaust structures comprise circular plates 31, 32, and 33, the latter two being similarly but oppositely configurated with uniformly spaced inner portions, i.e. substantially flat and circular collars 32a and substantially flat and circular disks 33a, defining a circular Venturi throat 34, and with uniformly but symmetrically wider spaced outer portions, i.e. outwardly turned circumferential flanges 32b and 33b, defining a relatively wide annular passage 35 serving as entry to and exit from the relatively constricted throat 34.

The plate 32 is advantageously formed as a part of exhaust pipe 21, and the plate 33 is secured thereto in properly spaced relation by means of members 36.

The plate 31 is preferably formed as a part of outer sleeve structure 28 and serves, in effect, as an escutcheon with respect to the outer surface of trailer wall 10a.

In operation, it has been found that the uniform Venturi throat type exhaust diverter passage causes wind or slip stream air to flow past exhaust port 29 as a relatively high velocity stream, which reduces the pressure at such port and is effective to maintain a positive draft at all times. Diverters of presently known type tend to direct such air into the exhaust port and to produce a reverse draft condition at speeds greater than about thirty-five miles per hour of the vehicle concerned. Embodiments of this invention have operated satisfactorily at the highest speeds possible to obtain for test purposes, i.e. ninety miles per hour.

While the combination of the disclosed heater construction with the specified draft diverter configuration is preferable for over-all best results, the draft diverter construction can be employed to advantage with many other heater arrangements.

Whereas there is here illustrated and described a specific form of apparatus which I presently regard as the best mode of carrying out my invention, it should be understood that various changes may be made and other constructions adopted without departing from the inventive concepts particularly pointed out and claimed herebelow.

I claim:

A dual-draft control device for combustion heaters adapted for use in vehicles, comprising
  pipe structure defining an exhaust port and passage;
  additional pipe structure surrounding the first pipe structure in spaced, sleeve fashion and defining therewith an air-intake port and passage;
  a circular collar fixed to and surrounding the exhaust port, said collar having an inner annular portion which is substantially flat;
  a circular disk spaced from said collar and having substantially the same outer circumference, said disk having a circular inner portion which is substantially flat, said inner annular portion of the said collar and said inner portion of said disk having substantially the same outer circumference;
  means holding said disk in a plane substantially parallel to the plane of said collar to form a Venturi throat section of substantially constant dimension;
  an outwardly-turned, circumferential flange rimming said collar;
  and a similar flange rimming said disk, the distance between said flanges being greater than the distance between said collar and said disk, said flange rimming the collar and the flange rimming the disk being substantially parallel, whereby the inlet to and outlet from the Venturi throat section are of substantially constant dimension.

References Cited in the file of this patent

UNITED STATES PATENTS

| | | |
|---|---|---|
| 1,854,232 | Smith | Apr. 19, 1932 |
| 2,755,794 | Wendell | July 24, 1956 |
| 2,811,095 | Moran | Oct. 29, 1957 |
| 2,966,838 | Thompson et al. | Jan. 3, 1961 |
| 3,052,230 | Conrad | Sept. 4, 1962 |

FOREIGN PATENTS

| | | |
|---|---|---|
| 723,437 | Great Britain | May 7, 1953 |
| 771,986 | Great Britain | Apr. 10, 1957 |
| 859,308 | Great Britain | Jan. 18, 1961 |